United States Patent
Hasegawa et al.

(10) Patent No.: US 9,505,078 B2
(45) Date of Patent: Nov. 29, 2016

(54) SPOT WELDING METHOD AND SPOT WELDING APPARATUS

(75) Inventors: Eisaku Hasegawa, Kanuma (JP); Sumitomo Watanabe, Tochigi-ken (JP); Masahito Mutou, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 13/234,243

(22) Filed: Sep. 16, 2011

(65) Prior Publication Data

US 2012/0074113 A1    Mar. 29, 2012

(30) Foreign Application Priority Data

Sep. 29, 2010   (JP) .................................. 2010-218372

(51) Int. Cl.
| | |
|---|---|
| *B23K 9/007* | (2006.01) |
| *B23K 11/11* | (2006.01) |
| *B23K 11/16* | (2006.01) |
| *B23K 11/31* | (2006.01) |

(52) U.S. Cl.
CPC .............. *B23K 11/115* (2013.01); *B23K 11/16* (2013.01); *B23K 11/312* (2013.01); *B23K 11/314* (2013.01); *B23K 2201/006* (2013.01); *B23K 2201/185* (2013.01); *B23K 2203/04* (2013.01)

(58) Field of Classification Search
CPC ... B23K 11/115; B23K 11/16; B23K 11/312; B23K 11/314; B23K 2201/006; B23K 2201/185; B23K 2203/04
USPC ............. 219/86.25, 86.51, 87, 88, 89, 117.1, 219/127, 161, 86.21, 86.22
See application file for complete search history.

(56) References Cited

U.S. PATENT DOCUMENTS 4,163,869 A  *  8/1979  Almand et al. ............. 174/94 R
4,876,430 A  *  10/1989  Herschitz et al. ............ 219/110
5,272,306 A  *  12/1993  Hirane .......................... 219/110

(Continued)

FOREIGN PATENT DOCUMENTS

JP       05-277747     * 10/1993    ............. B23K 11/11
JP       05-277747 A    10/1993

(Continued)

OTHER PUBLICATIONS

Office Action dated Dec. 3, 2013 issued over corresponding Japanese Patent Application No. 2010-218372.

*Primary Examiner* — Dana Ross
*Assistant Examiner* — James Sims, III
(74) *Attorney, Agent, or Firm* — Carrier Blackman & Associates P.C.; Joseph P. Carrier; William D. Blackman

(57) ABSTRACT

A spot welding method and a spot welding apparatus are provided. A stacked assembly of at least three workpieces is gripped between first and second welding tips. An inner workpiece positioned inside of the stacked assembly, of two of the workpieces that exhibit a maximum contact resistance in the stacked assembly, is electrically connected to a ground electrode, or to an electrode having the same polarity as the second welding tip near an outer workpiece positioned adjacent to the inner workpiece and facing outwardly from the stacked assembly, of the two workpieces. Then, electric current is applied from the first welding tip toward the second welding tip. In this case, first, the stacked assembly is pressed under a first pressing force, and then, the stacked assembly is pressed under a second pressing force which is greater than the first pressing force.

4 Claims, 6 Drawing Sheets

(56) References Cited

U.S. PATENT DOCUMENTS

| | | | | |
|---|---|---|---|---|
| 5,321,225 | A * | 6/1994 | Boyer | 219/89 |
| 5,866,868 | A * | 2/1999 | Hirane | 219/110 |
| 6,069,338 | A * | 5/2000 | Sano | B23K 11/314 |
| | | | | 219/86.22 |
| 6,326,580 | B1 * | 12/2001 | Hiiro | B23K 11/241 |
| | | | | 219/110 |
| 7,282,659 | B1 * | 10/2007 | Gibbs et al. | 219/56 |
| 7,738,996 | B2 * | 6/2010 | Luthardt | 700/245 |
| 2007/0175868 | A1 * | 8/2007 | Christensen et al. | 219/86.25 |
| 2009/0302008 | A1 * | 12/2009 | Maruyama | B23K 11/255 |
| | | | | 219/91.1 |
| 2009/0302010 | A1 * | 12/2009 | Goto et al. | 219/117.1 |

FOREIGN PATENT DOCUMENTS

| | | | |
|---|---|---|---|
| JP | 2003-071569 A | 3/2003 | |
| JP | 2006-055898 A | 3/2006 | |
| JP | 2008-290099 | * 12/2008 | B23K 11/11 |
| JP | 2008-290099 A | 12/2008 | |
| JP | 2009-190050 A | 8/2009 | |

* cited by examiner

SPOT WELDING METHOD AND SPOT WELDING APPARATUS

CROSS-REFERENCE TO RELATED APPLICATION

This application is based upon and claims the benefit of priority from Japanese Patent Application No. 2010-218372 filed on Sep. 29, 2010, of which the contents are incorporated herein by reference.

BACKGROUND OF THE INVENTION

1. Field of the Invention:

The present invention relates to a spot welding method and a spot welding apparatus for spot-welding a stacked assembly of three or more workpieces.

2. Description of the Related Art:

For manufacturing automotive bodies, for example, it is occasionally customary to spot-weld a stacked assembly of thick high-resistance workpieces made of high tensile strength steel and a thin low-resistance workpiece made of mild steel.

Japanese Laid-Open Patent Publication No. 2006-055898 discloses a spot-welding process for spot-welding such a stacked assembly. According to the disclosed spot-welding process, when an electric current flows through the stacked assembly in an energization sequence, the pressing force applied to the stacked assembly by a first welding tip and a second welding tip is reduced in an initial stage of the energization sequence and then increased in a late stage of the energization sequence, and a current flowing between the first welding tip and the second welding tip is increased in the initial stage and reduced in the late stage. In other words, the pressing force is set to a low level and the current to a high value in the initial stage, and the pressing force is set to a high level and the current to a low value in the late stage.

The high-resistance workpieces, which are positioned in lowest and central regions of the stacked assembly, have a large electric resistance. Therefore, the contact resistance in the vicinity of contacting surfaces of the high-resistance workpieces is also large. Consequently, a large amount of Joule heat is generated in the vicinity of the contacting surfaces. On the other hand, the contact resistance in the vicinity of contacting surfaces of the high-resistance workpiece in the central region and the low-resistance workpiece in a highest region of the stacked assembly is smaller than the contact resistance in the vicinity of the contacting surfaces of the high-resistance workpieces because the resistance of the low-resistance workpiece is smaller.

When the stacked assembly is spot-welded, a melted area is initially developed in the vicinity of the contacting surfaces of the high-resistance workpieces. In some cases, the melted area between the high-resistance workpieces may grow larger before a melted area is developed in the vicinity of the contacting surfaces of the low-resistance workpiece and the high-resistance workpiece.

According to the spot-welding process disclosed in Japanese Laid-Open Patent Publication No. 2006-055898, the pressing force applied to the stacked assembly is reduced in the initial stage of the energization sequence. As a result, a minute gap may possibly be generated between the workpieces. If such a minute gap is generated between the workpieces and the energization sequence is thereafter continued in order to form a melted area in the vicinity of the contacting surfaces of the low-resistance workpiece and the high-resistance workpiece, then the melted area may possibly be scattered, i.e., sputtering may possibly occur, from the gap between the high-resistance workpieces.

If the energization sequence is stopped, however, a sufficiently large melted area and hence a nugget produced in a solid phase from the melted area are not formed between the contacting surfaces of the low-resistance workpiece and the high-resistance workpiece. Accordingly, it is difficult to achieve a desired bonding strength between the low-resistance workpiece and the high-resistance workpiece.

If the pressing force is increased in the initial stage of the energization sequence in order to avoid the above difficulties, then as the contacting areas of the low-resistance workpiece and the high-resistance workpiece becomes larger, resulting in a reduction in the contact resistance in the vicinity of the contacting surfaces. The amount of generated Joule heat is then reduced, making it difficult to cause the melted area and hence the nugget to glow sufficiently large.

SUMMARY OF THE INVENTION

It is a general object of the present invention to provide a spot welding method which is capable of causing a nugget to grow sufficiently large in the vicinity of contacting workpiece surfaces of a stacked assembly of three or more workpieces.

A major object of the present invention is to provide a spot welding method which is capable of eliminating the possibility of sputtering in workpieces when they are spot-welded.

Another object of the present invention is to provide a spot welding apparatus for carrying out the above spot welding method.

According to an aspect of the present invention, there is provided a spot welding method for spot-welding a stacked assembly of at least three workpieces, comprising the steps of:

gripping the stacked assembly between a first welding tip and a second welding tip, and electrically connecting an inner workpiece, which is positioned inside of the stacked assembly, to a ground electrode, or to an electrode which is of the same polarity as the second welding tip positioned in proximity to an outer workpiece, which is positioned adjacent to the inner workpiece and faces outwardly from the stacked assembly, wherein the inner workpiece and the outer workpiece exhibit a maximum contact resistance in the stacked assembly;

passing an electric current from the first welding tip toward the second welding tip thereby to generate an electric current flowing from the first welding tip through the inner workpiece toward the ground electrode or toward the electrode, and pressing the stacked assembly under a first pressing force by the first welding tip and the second welding tip thereby to join the inner workpiece to another one of the workpieces; and pressing the stacked assembly under a second pressing force which is greater than the first pressing force, thereby to join the inner workpiece to the outer workpiece.

According to the present invention, the stacked assembly is gripped between the first welding tip and the second welding tip, and the ground electrode or the electrode which is of the same polarity as the second welding tip is electrically connected to a high-resistance workpiece (inner workpiece) which is positioned inside of the stacked assembly, of two high-resistance workpieces (inner and outer workpieces) which exhibit a maximum contact resistance in the vicinity of contacting surfaces thereof within the stacked assembly. Then, an energization sequence is started to pass an electric current from the first welding tip toward the second welding tip.

In an initial stage of the energization process, the stacked assembly is gripped under a relatively small first pressing force. Therefore, the contact area between a low-resistance workpiece and another workpiece of the stacked assembly is small, resulting in an increased contact resistance in the vicinity of contacting surfaces thereof. As a result, a large amount of Joule heat is generated in the vicinity of the contacting surfaces, thereby producing a sufficiently grown welding area and hence a sufficiently grown nugget in the vicinity of the contacting surfaces.

The contact area between the high-resistance workpieces exhibiting a maximum contact resistance is also small, resulting in an increased contact resistance in the vicinity of contacting surfaces thereof. Consequently, the electric current is difficult to flow in the vicinity of the contacting surfaces. As a consequence, most of the electric current does not flow toward the second welding tip, but flows preferentially toward the ground electrode or toward the electrode which is of the same polarity as the second welding tip.

Thus, a melted region does not grow significantly in the vicinity of the contacting surfaces of the high-resistance workpieces which exhibit the maximum contact resistance. Even if there is a gap between the high-resistance workpieces, sputtering is less liable to develop between their contacting surfaces while the melted region is growing between the low-resistance workpiece and the other workpiece.

Thereafter, the pressing force applied to the stacked assembly is increased. Accordingly, the contact area between the high-resistance workpieces increases, resulting in a reduced contact resistance therebetween. The electric current becomes more liable to flow in the vicinity of the contacting surfaces of the high-resistance workpieces. Most of the electric current then flows toward the second welding tip. A large amount of Joule heat is thus generated in the vicinity of the contacting surfaces, thereby producing a sufficiently grown welding area and hence nugget.

Since the contact resistance between the low-resistance workpiece and the other workpiece is small during this time, excessive Joule heat is prevented from being generated in the vicinity of their contacting surfaces. Furthermore, since the electric current has already passed through the contacting surfaces of the low-resistance workpiece and the other workpiece, these contacting surfaces have had an increased level of affinity. Accordingly, sputtering is difficult to develop between the contacting surfaces of the low-resistance workpiece and the inner workpiece.

According to the present invention, as described above, it is possible to form a sufficiently large nugget in the vicinity of contacting surfaces of adjacent workpieces while preventing sputtering from occurring therebetween. Consequently, a joined assembly with an excellent bonding strength can be produced.

The electrode can be of the same polarity as the second welding tip by being electrically connected to the second welding tip, for example.

According to another aspect of the present invention, there is provided a spot welding apparatus for spot-welding a stacked assembly of at least three workpieces, comprising:

a first welding tip and a second welding tip for gripping the stacked assembly between the first welding tip and the second welding tip; and an electrode electrically connected to an inner workpiece, which is positioned inside of the stacked assembly, of two of the workpieces that exhibit a maximum contact resistance in the stacked assembly;

the electrode comprising either a ground electrode, or an electrode which is of the same polarity as the second welding tip positioned in proximity to an outer workpiece, which is positioned adjacent to the inner workpiece and faces outwardly from the stacked assembly, of the two of the workpieces.

The spot welding apparatus thus arranged is capable of carrying out the above spot welding method. Thus, a sufficiently large nugget is formed in the vicinity of contacting surfaces of adjacent workpieces, and as a result, a joined assembly with an excellent bonding strength can be obtained.

The electrode can be of the same polarity as the second welding tip by being electrically connected to the second welding tip, for example.

If the electrode is the ground electrode, then the spot welding apparatus may further comprise a clamping mechanism for gripping the stacked assembly. The clamping mechanism and the ground electrode grip the stacked assembly therebetween for keeping the stacked assembly in a stable attitude to allow the stacked assembly to be spot-welded easily.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Spot welding methods according to preferred embodiments of the present invention in relation to spot welding apparatus which carry out the spot welding methods will be described in detail below with reference to the accompanying drawings.

Figure 1:
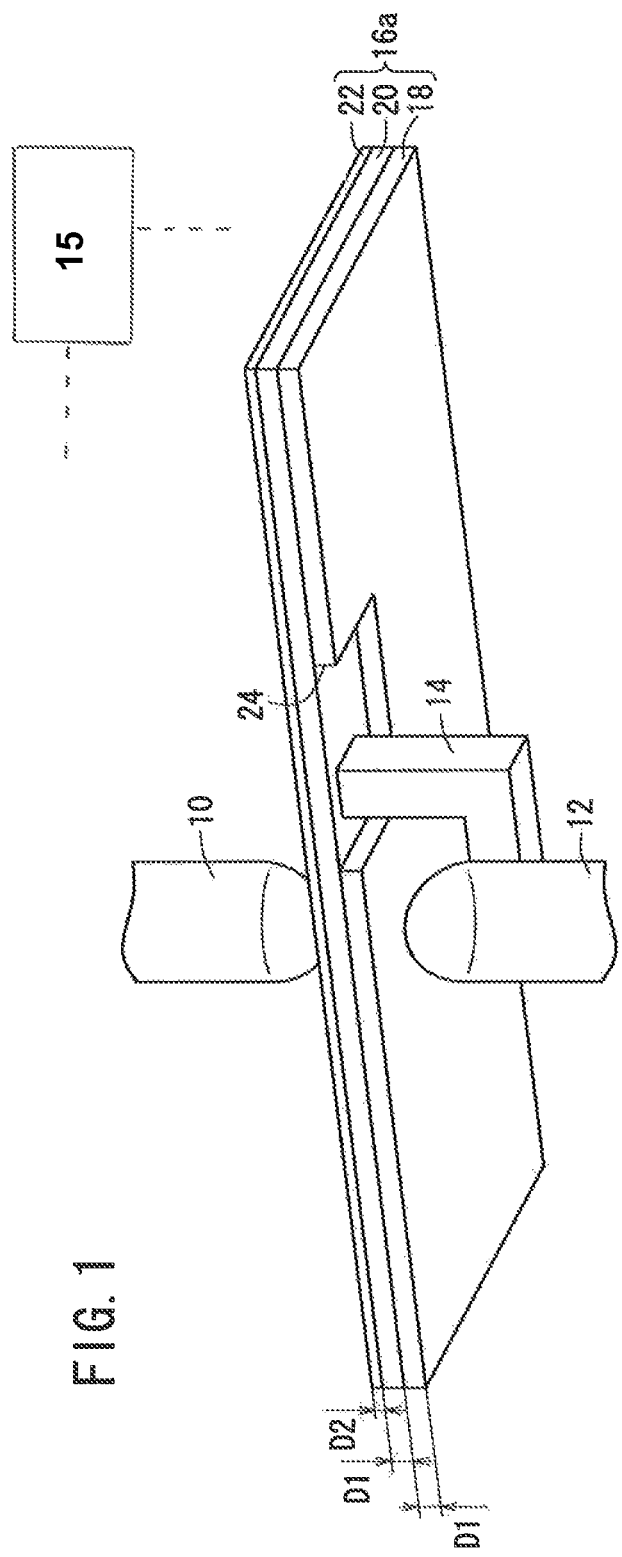
FIG. 1 is an enlarged perspective view of a spot welding apparatus according to a first embodiment of the present invention.

FIG. 1 is an enlarged perspective view of a spot welding apparatus according to a first embodiment of the present invention. As shown in FIG. 1, the spot welding apparatus according to the first embodiment includes a welding gun, not shown, having a first welding tip 10, a second welding tip 12, and an auxiliary electrode 14. The welding gun is mounted on the distal end of an arm of an articulated robot such as a 6-axis robot or the like. The combination of a welding gun and an arm of an articulated robot is well known in the art, and will not be described in detail below.

The first welding tip 10 and the second welding tip 12, each in the form of a long rod, grip a stacked assembly 16a to be spot-welded therebetween, and pass an electric current through the stacked assembly 16a in an energization sequence. The first welding tip 10 and the second welding tip 12 are electrically connected respectively to positive and negative terminals of a power supply, not shown. The first welding tip 10 serves as a positive pole (+) and the second welding tip 12 as a negative pole (−), so that an electric current flows from the first welding tip 10 through the stacked assembly 16a to the second welding tip 12 in the energization sequence of the spot welding.

The auxiliary electrode 14, which is substantially L-shaped, is mechanically joined and hence electrically connected to the second welding tip 12. Therefore, the auxiliary electrode 14 serves as a negative pole (−) as with the second welding tip 12, and hence is opposite in polarity to the first welding tip 10 serving as a positive pole (+).

If the welding gun is an X-type welding gun, then the first welding tip 10 is mounted on one of a pair of openable and closable chucks, i.e., which are movable toward and away from each other, and the second welding tip 12 and the auxiliary electrode 14 are mounted on the other chuck. When the chucks are opened (moved away from each other) or closed (moved toward each other), the first welding tip 10, and the second welding tip 12 and the auxiliary electrode 14 are moved away from or toward each other.

If the welding gun is a C-type welding gun, then the second welding tip 12 and the auxiliary electrode 14 are mounted on the distal end of a fixed arm, and the first welding tip 10 is mounted, for example, on a ball screw movable, upon rotation about its own axis, toward and away from the fixed arm. When the ball screw is rotated about its own axis in one direction or the other, the first welding tip 10 is moved toward or away from the second welding tip 12 and the auxiliary electrode 14.

The power supply and the pair of chucks or the ball screw are electrically connected to a gun controller, generally shown at 15, serving as a control means. The gun controller thus controls the energization and de-energization of the power supply and the opening/closing movement of the chucks or the vertical movement of the ball screw.

The stacked assembly 16a to be spot-welded comprises three metal sheets 18, 20, 22 stacked together which are arranged upwardly in the order named. Of the three metal sheets 18, 20, 22, each of the metal sheets 18, 20 has a thickness D1 in the range from about 1 mm to about 2 mm, and the metal sheet 22 has a thickness D2 in the range from about 0.5 mm to about 0.7 mm, which is smaller than the thickness D1. In other words, the metal sheets 18, 20 are equal in thickness, and the metal sheet 22 is thinner than the metal sheets 18, 20. Stated otherwise, the thickness of the metal sheet 22 is minimum among the three metal sheets 18, 20, 22 that make up the stacked assembly 16a.

The metal sheets 18, 20 are high-resistance workpieces made of JAC590, JAC780, or JAC980 (high-performance high tensile strength steel sheets defined according to the Japan Iron and Steel Federation Standard). The metal sheet 22 is a low-resistance workpiece made of, for example, a mild steel sheet such as JAC270 (which is a high-performance steel sheet for press-forming defined according to the Japan Iron and Steel Federation Standard). The metal sheets 18, 20 may be made of the same metal or different metals.

The stacked assembly 16a is constructed such that the high-resistance workpiece (metal sheet 18), the high-resistance workpiece (metal sheet 20), and the low-resistance workpiece (metal sheet 22) are stacked successively in the order named along a direction from the second welding tip 12 to the first welding tip 10. The contact resistance in the vicinity of contacting surfaces of adjacent workpieces is greater between the metal sheets 18, which are the high-resistance workpieces, and smaller between the metal sheets 20, 22 which are the high-resistance workpiece and the low-resistance workpiece.

Therefore, a combination of two workpieces that exhibits a maximum contact resistance is provided by the metal sheets 18, 20. Of this combination, the metal sheet 20 is positioned inside of the stacked assembly 16a, i.e., serves as an inner workpiece, and the metal sheet 18 which is positioned adjacent to the metal sheet 20 serves as an outer workpiece facing outwardly from the stacked assembly 16a.

The metal sheet 18 has an insertion window 24 defined therein by cutting off a portion thereof. The metal sheet 20 has a lower end surface exposed through the insertion window 24. The auxiliary electrode 14 that is joined to the second welding tip 12 is inserted in the insertion window 24 and held in abutment against the lower end surface of the metal sheet 20. Therefore, the auxiliary electrode 14 and the metal sheet 20 are electrically connected to each other.

The second welding tip 12 is held in abutment against the metal sheet 18 serving as the outer workpiece. The second welding tip 12 that is held in contact with the metal sheet 18 (outer workpiece) and the auxiliary electrode 14 that is electrically connected to the metal sheet 20 serving as the inner workpiece are of the same polarity.

The spot welding apparatus according to the first embodiment is basically constructed as described above. Operation and advantages of the spot welding apparatus in relation to the spot welding method carried out thereby will be described below.

For resistance-welding, i.e., spot-welding, the stacked assembly 16a, or stated otherwise, for joining the metal sheets 18, 20 to each other as well as joining the metal sheets 20, 22 to each other, first the articulated robot moves the welding gun so as to position the stacked assembly 16a between the first welding tip 10 and the second welding tip 12 under the control of the gun controller. Thereafter, the chucks are closed (moved toward each other), or the ball screw is rotated about its own axis, then to move the first welding tip 10, and the second welding tip 12 and the auxiliary electrode 14 relatively toward each other, thereby gripping the stacked assembly 16a between the first welding tip 10, and the second welding tip 12 and the auxiliary electrode 14. At the same time, the tip end of the auxiliary electrode 14 is inserted into the insertion window 24 defined in the metal sheet 18 and brought into abutment against the lower end surface of the metal sheet 20.

Figure 2:
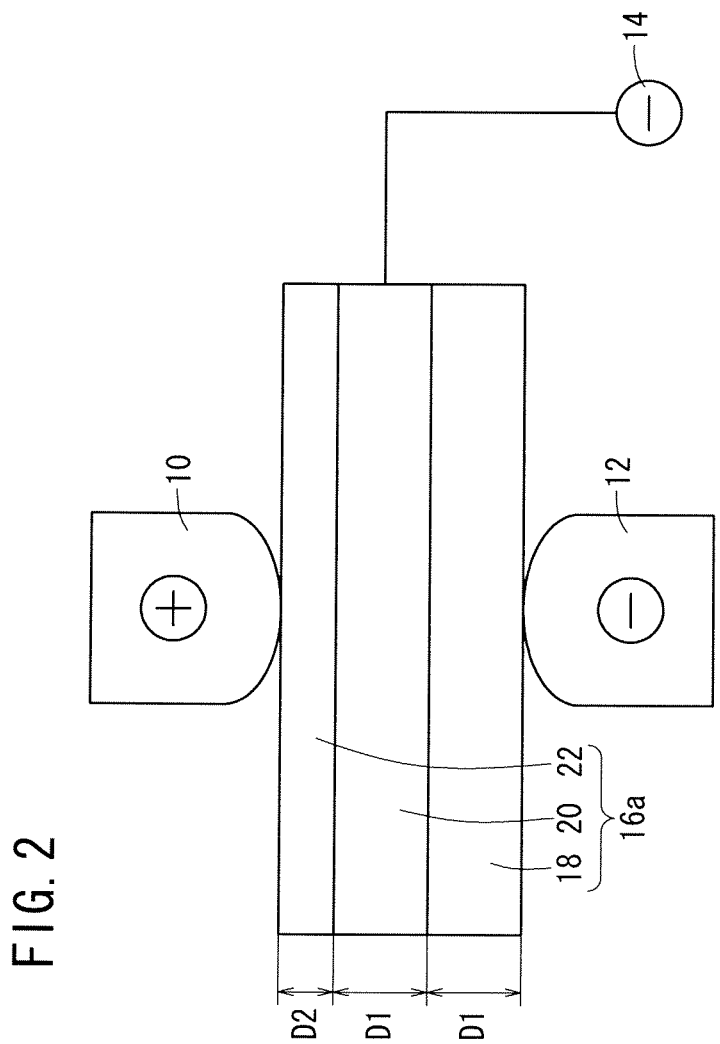
FIG. 2 is a schematic vertical cross-sectional view of a stacked assembly gripped between a first welding tip and a second welding tip shown in FIG. 1, the stacked assembly including a central workpiece (metal sheet) connected to an auxiliary electrode.

The stacked assembly 16a thus gripped between the first welding tip 10 and the second welding tip 12 is schematically shown in FIG. 2. The electric connection between the metal sheet 20 and the auxiliary electrode 14 is illustrated in an equivalent circuit diagram.

At this time, it is assumed that the first welding tip 10 and the second welding tip 12 apply respective pressing forces f1, f1' to the stacked assembly 16a. Then, the stacked assembly 16a is subjected to a first pressing force F1 which is the sum of the pressing forces f1, f1'. The first pressing force F1 is smaller than a second pressing force F2 which is subsequently applied, but large enough to hold the stacked assembly 16a sufficiently. In other words, the first pressing force is commensurate with intensity for contacting the low-resistance workpiece with the inner workpiece and for contacting the high-resistance workpieces to each other at positions aligned with the first welding tip and the second welding tip. In this case, a pressing force that the auxiliary electrode 14 applies to the metal sheet 20 may be so small that the auxiliary electrode 14 is merely held in contact with the metal sheet 20. Accordingly, the pressing force applied by the auxiliary electrode 14 is negligible.

Figure 3:
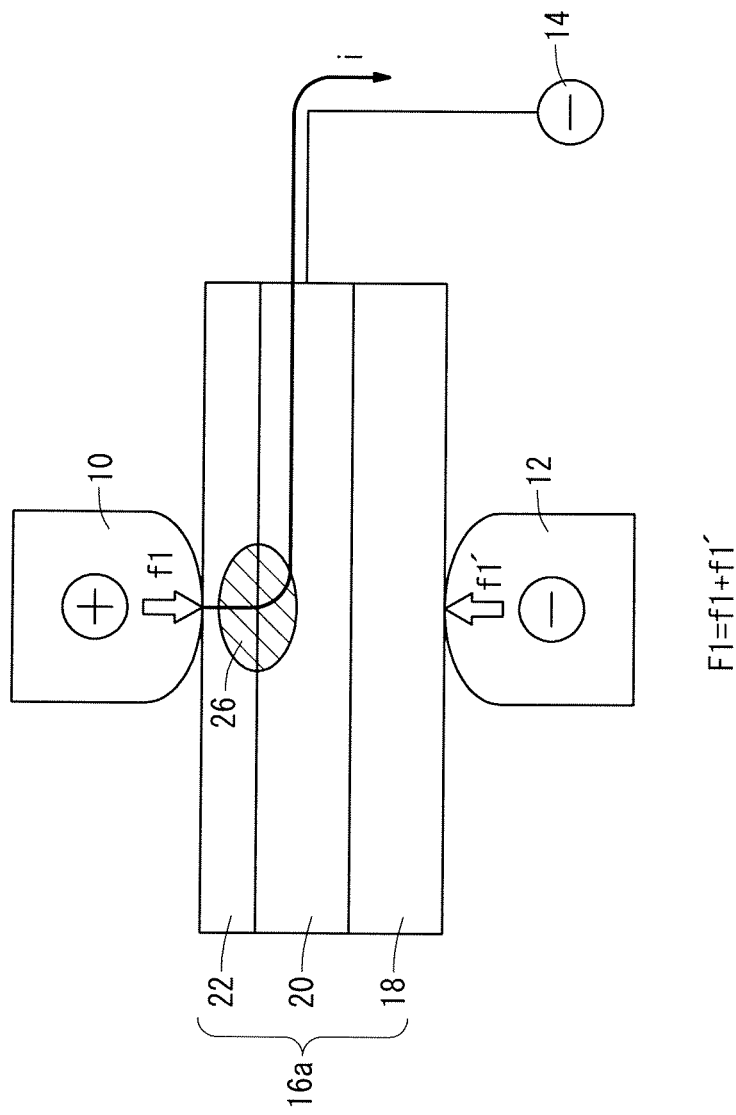
FIG. 3 is a schematic vertical cross-sectional view of the stacked assembly at the time an energization sequence is started to pass an electric current through the stacked assembly shown in FIG. 2 while the stacked assembly is gripped at a first pressing force.

When the gun controller recognizes that the stacked assembly 16a is gripped between the first welding tip 10 and the second welding tip 12 as shown in FIGS. 1 and 2, based on a signal from a contact sensor, not shown, the gun controller starts an energization sequence to pass an electric current from the first welding tip 10 toward the second welding tip 12, as shown in FIG. 3.

Since the first pressing force F1 applied from the first welding tip 10 and the second welding tip 12 to the stacked assembly 16a is sufficiently small, the contact pressure acting between the metal sheets 20, 22 is also small. As a result, the contact area between the metal sheets 20, 22 is also small. Therefore, the contact resistance in the vicinity of contacting surfaces of the metal sheets 20, 22 is large. However, since the metal sheet 22 is the low-resistance workpiece with the low electric resistance and the small thickness, an electric current i flowing from the first welding tip 10 can pass through the metal sheet 22 to the metal sheet 20.

The electric current i generates Joule heat, heating and melting contacting portions of the metal sheets 20, 22 into a melted area 26.

At this time, the contact pressure acting between the metal sheets 18, 20 is also small. As a result, the contact area between the metal sheets 18, 20 is also small. Therefore, the contact resistance in the vicinity of contacting surfaces of the metal sheets 18, 20 is larger. Thus, it is difficult for an electric current to flow from the metal sheet 20 through the metal sheet 18 toward the second welding tip 12. Accordingly, most of the electric current supplied from the first welding tip 10 flows as the electric current i shown in FIG. 3 from the metal sheet 20 toward the auxiliary electrode 14, rather than toward the contacting surfaces of the metal sheets 18, 20 which are of the high electric resistance.

In the above initial stage of the spot-welding process, the contacting surfaces of the metal sheets 20, 22 are preferentially heated, producing the melted area 26. On the other hand, a melted area is prevented from growing in the vicinity of the contacting surfaces of the metal sheets 18, 20 because it is difficult for an electric current to flow from the metal sheet 20 through the metal sheet 18 toward the second welding tip 12 due to the large contact resistance in the vicinity of the contacting surfaces of the metal sheets 18, 20. Consequently, even if there is a gap between the metal sheets 18, 20, sputtering is less liable to develop between the contacting surfaces of the metal sheets 18, 20.

The melted area 26 grows larger with time insofar as the energization sequence continues. Stated otherwise, the melted area 26 and hence a nugget which is produced in a solid phase from the melted area 26 grow sufficiently by continuing the energization sequence for a certain period of time. The degree to which the melted area 26 (nugget) grows with respect to the period of time for which the energization sequence continues may be confirmed in advance by a spot-welding test conducted on test pieces.

When a preset time set in the gun controller is reached, the gun controller increases the pressing force applied to the stacked assembly 16a by the first welding tip 10 and the second welding tip 12. More specifically, as shown in FIG. 4, the gun controller increases the pressing forces applied respectively by the first welding tip 10 and the second welding tip 12 from f1, f1' to f2, f2', thereby setting a second pressing force F2 which is greater than the first pressing force F1, where the second pressing force F2 is the sum of f2, f2'.

As the pressing force increases, the contact pressure acting between the metal sheets 20, 22 and the contact pressure acting between the metal sheets 18, 20 increase. As a result, the contact area between the metal sheets 20, 22 and the contact area between the metal sheets 18, 20 increase accordingly. Therefore, the contact resistance in the vicinity of the contacting surfaces of the metal sheets 20, 22 and the contact resistance in the vicinity of the contacting surfaces of the metal sheets 18, 20 are reduced.

Figure 4:
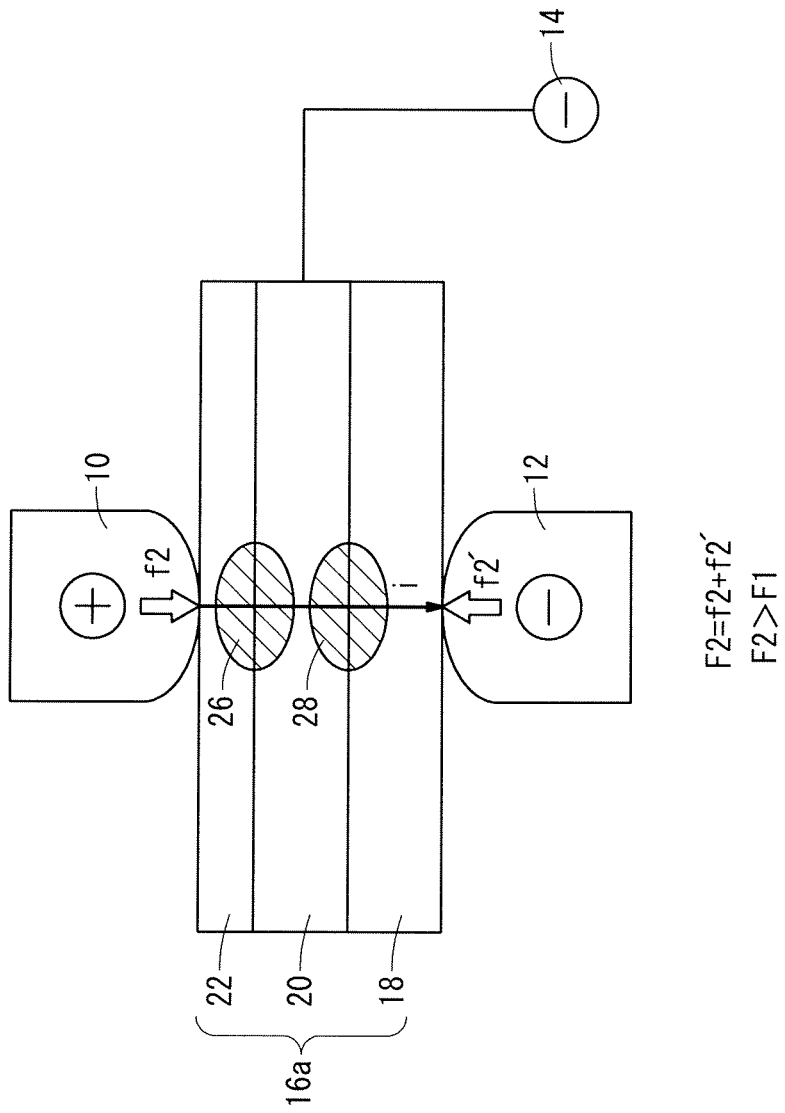
FIG. 4 is a schematic vertical cross-sectional view of the stacked assembly at the time an energization sequence is started to pass an electric current through the stacked assembly shown in FIG. 3 while the stacked assembly is gripped at a second pressing force, which is greater than the first pressing force.

Upon the reduction of the contact resistance, the electric current that has reached the metal sheet 20 flows as an electric current i toward the metal sheet 18, as shown in FIG. 4. The electric current i thus flowing generates Joule heat, thereby heating and melting contacting portions of the metal sheets 18, 20 into a melted area 28.

Thereafter, the gun controller continues the energization sequence until the melted area 28 grows sufficiently. The degree to which the melted area 28 (nugget) grows with respect to the period of time for which the energization sequence continues may be confirmed in advance by a spot-welding test conducted on test pieces. The contact resistance in the vicinity of the contacting surfaces of the metal sheets 20, 22 is smaller than the contact resistance in the vicinity of the contacting surfaces of the metal sheets 18, 20. Therefore, the melted area 26 does not grow significantly during the energization sequence for causing the melted area 28 to grow.

As described above, the pressing force applied to the stacked assembly 16a is controlled to produce the sufficiently large melted area 26 in the vicinity of the contacting surfaces of the metal sheet 20 as the high-resistance workpiece and the metal sheet 22 as the low-resistance workpiece, and thereafter to produce the sufficiently large melted area 28 in the vicinity of the contacting surfaces of the metal sheets 18, 20 as the high-resistance workpieces.

Inasmuch as the contact resistance in the vicinity of the contacting surfaces of the metal sheets 18, 20 is small, as described above, the amount of Joule heat generated in the metal sheets 18, 20 is small. Furthermore, since the electric current has already passed through the contacting surfaces of the metal sheets 18, 20, the contacting surfaces of the metal sheets 18, 20 have had an increased level of affinity. Accordingly, sputtering is difficult to develop between the contacting surfaces of the metal sheets 18, 20.

According to the present embodiment, therefore, it is possible to avoid sputtering when the melted area 26 is grown between the metal sheets 20, 22 and also when the melted area 28 is grown between the metal sheets 18, 20.

When a preset period of time set in the gun controller, i.e., a period of time required for the melted area 28 to grow sufficiently, has elapsed, an ON/OFF switch, not shown, for example, is turned off to stop the energization process, and then the first welding tip 10 is relatively moved away from the second welding tip 12 and the auxiliary electrode 14. Alternatively, the first welding tip 10 may be spaced away from the metal sheet 22 so as to electrically insulate the first welding tip 10 from the second welding tip 12 and the auxiliary electrode 14, thereby stopping the energization sequence.

When the energization sequence (welding process) is stopped, the contacting surfaces of the metal sheets 18, 20 and the contacting surfaces of the metal sheets 20, 22 cease to be heated. As time goes on, the melted areas 26, 28 are cooled and solidified into nuggets. The metal sheets 18, 20 and the metal sheets 20, 22 are joined to each other by the respective nuggets.

In this manner, the metal sheets 18, 20 and the metal sheets 20, 22 of the stacked assembly 16a are joined to each other, thereby to produce a joined assembly.

In the joined assembly, the bonding strength of the metal sheets 20, 22 is excellent as is the case with the bonding strength of the metal sheets 18, 20 because, as described above, the sufficiently grown nugget is present in the vicinity of the contacting surfaces of the metal sheet 22 as the low-resistance workpiece and the metal sheet 20 as the high-resistance workpiece.

Figure 5:
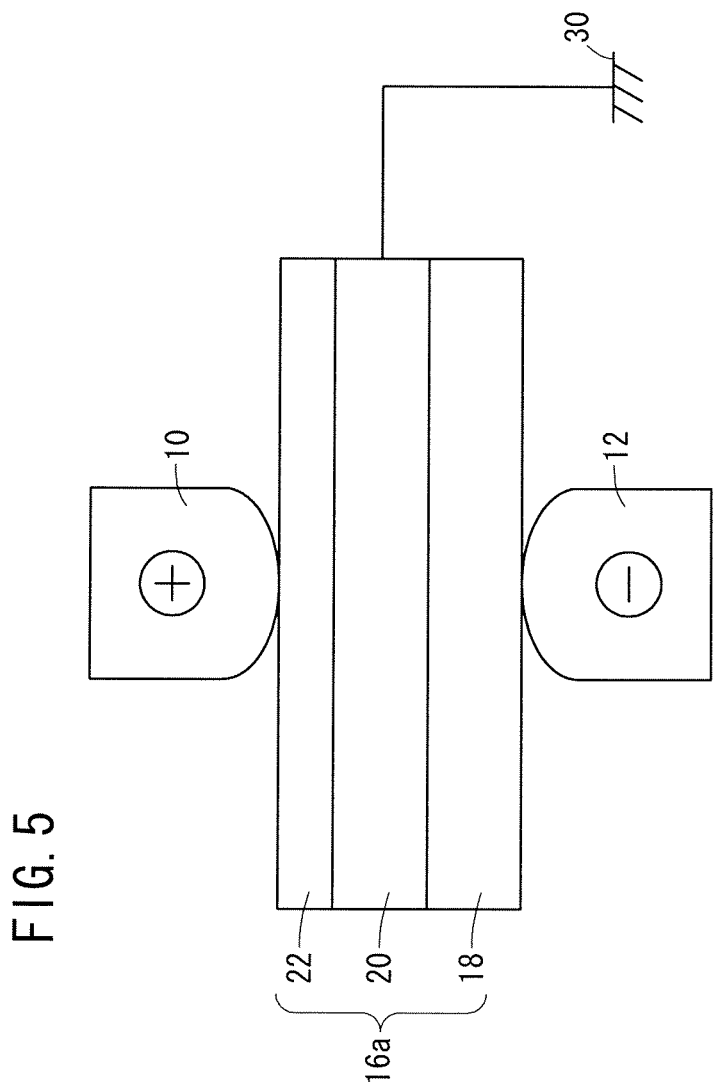
FIG. 5 is a schematic vertical cross-sectional view of the stacked assembly with the central workpiece (metal sheet) electrically connected to a ground electrode, rather than the auxiliary electrode.

In the first embodiment, the metal sheet 20 is electrically connected to the auxiliary electrode 14 which is of the same polarity as the second welding tip 12. However, as shown in FIG. 5, the metal sheet 20 may be connected to a ground electrode 30. Even with the metal sheet 20 connected to the ground electrode 30, the electric currents i flow preferentially through the paths shown in FIGS. 3 and 4 when the pressing force applied to the stacked assembly 16a by the first welding tip 10 and the second welding tip 12 is controlled as described above.

A spot welding apparatus according to a second embodiment of the present invention will be described below with reference to FIG. 6. Those parts of the spot welding apparatus shown in FIG. 6 which are identical to those of the spot welding apparatus shown in FIGS. 1 through 5 are denoted by identical reference characters, and will not be described in detail below.

Figure 6:
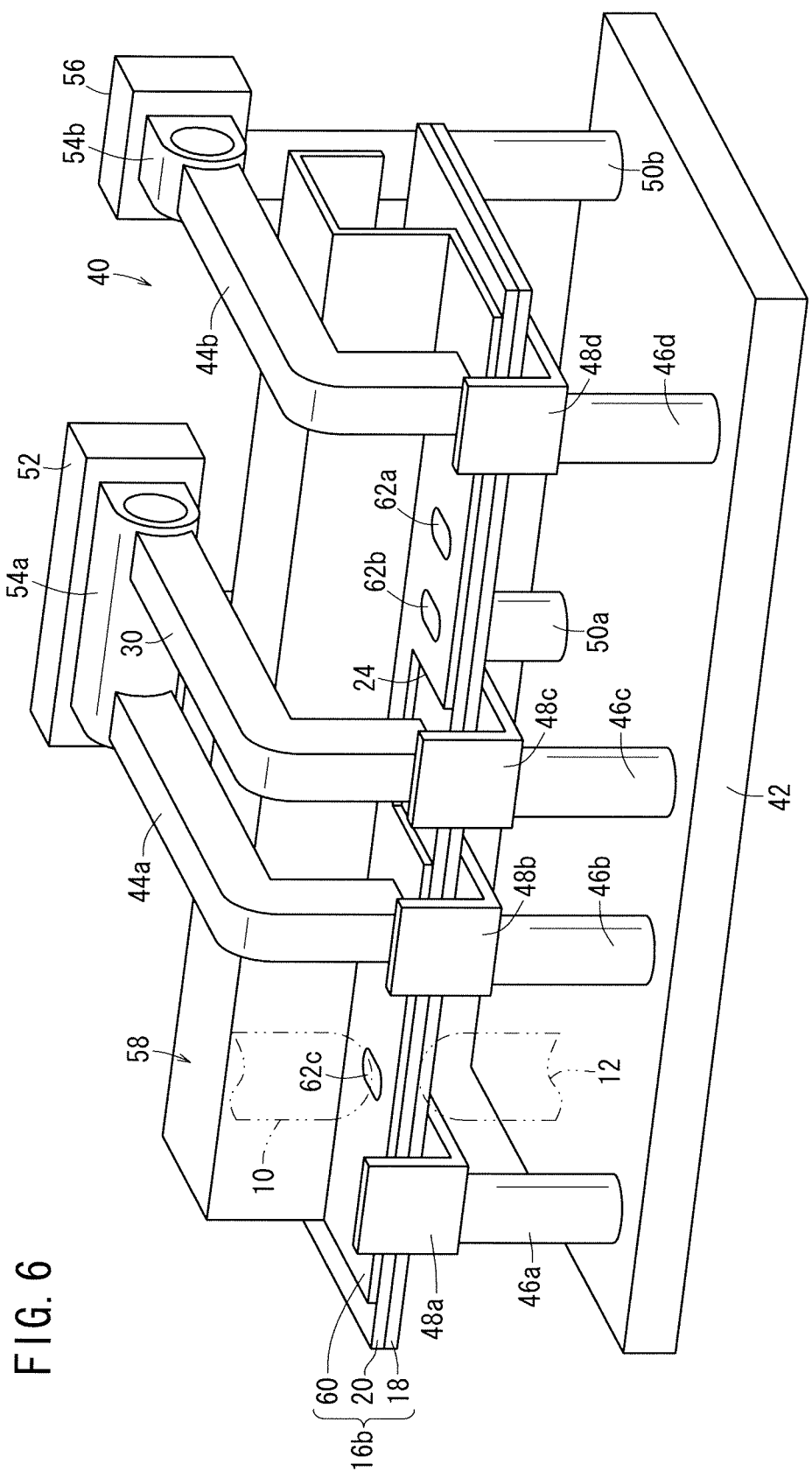
FIG. 6 is an enlarged perspective view of a spot welding apparatus according to a second embodiment of the present invention.

FIG. 6 is an enlarged perspective view of a spot welding apparatus according to a second embodiment of the present invention. As shown in FIG. 6, the spot welding apparatus according to the second embodiment includes a first welding tip 10, a second welding tip 12, and a clamping mechanism 40. The spot welding apparatus spot-welds a stacked assembly 16b.

The clamping mechanism 40 includes a support foundation 42 and clamping fingers 44a, 44b. First columnar members 46a through 46d which are of a relatively small vertical dimension are vertically mounted on the support foundation 42, and bases 48a through 48d are mounted respectively on the distal ends of the first columnar members 46a through 46d. The stacked assembly 16b is placed and supported on all the bases 48a through 48d.

Second columnar members 50a, 50b which are of a relatively large vertical dimension are also vertically mounted on the support foundation 42. A long support plate 52 is mounted on the distal end of the second columnar member 50a, and the clamping finger 44a and a ground electrode 30 are swingably mounted on the long support plate 52 by a swinging mechanism 54a. A short support plate 56 is mounted on the distal end of the second columnar member 50b, and the clamping finger 44b is swingably mounted on the short support plate 56 by a swinging mechanism 54b. The clamping fingers 44a, 44b and the ground electrode 30 can be swung by the swinging mechanisms 54a, 54b when the swinging mechanisms 54a, 54b are actuated by a gun controller such as the controller 15 generally shown in FIG. 1.

The stacked assembly 16b comprises metal sheets 18, 20 as high-resistance workpieces made of high tensile strength steel and a flat weld region 60 of a machined workpiece 58 made of mild steel. The machined workpiece 58 includes a channel portion having a substantially C-shaped cross section and the flat weld region 60 which projects from an edge of the channel portion.

The flat weld region 60 is thinner than the metal sheets 18, 20, and the machined workpiece 58 is made of mild steel, which has a smaller electric resistance. Accordingly, the machined workpiece 58 and thus the flat weld region 60 have a smaller electric resistance than the metal sheets 18, 20. Stated otherwise, the machined workpiece 58 serves as a low-resistance workpiece. Thus, the stacked assembly 16b is also constructed such that the high-resistance workpiece (metal sheet 18), the high-resistance workpiece (metal sheet 20), and the low-resistance workpiece (flat weld region 60) are stacked successively in the order named along a direction from the second welding tip 12 to the first welding tip 10.

The flat weld region 60 has an insertion window 24 defined therein by cutting off a portion thereof. The metal sheet 20 has an upper end surface exposed through the insertion window 24. The ground electrode 30 is inserted in the insertion window 24 and held in abutment against the upper end surface of the metal sheet 20.

The spot welding apparatus according to the second embodiment operates as follows: First, the stacked assembly 16b is placed on the bases 48a through 48d. At this time, the stacked assembly 16b is positionally adjusted so as to keep the insertion window 24 in alignment with the ground electrode 30.

Then, the swinging mechanisms 54a, 54b are actuated under the control of the gun controller so as to swing the clamping fingers 44a, 44b, and then the clamping fingers 44a, 44b, in cooperation with the bases 48b, 48d, clamp the metal sheets 18, 20 and the flat weld region 60, i.e., the stacked assembly 16b therebetween. At the same time, the ground electrode 30 is inserted into the insertion window 24 and brought into abutment against the upper end surface of the metal sheet 20.

Then, the first welding tip 10 and the second welding tip 12 grip the stacked assembly 16b therebetween, and presses the stacked assembly 16b with a pressing force F1 which is the same as the pressing force according to the first embodiment. Thereafter, the gun controller applies an electric current from the first welding tip 10 toward the second welding tip 12. Subsequently, for the reasons described above in the first embodiment, the applied electric current flows preferentially as the electric current i shown in FIG. 3 along a direction from the first welding tip 10 to the ground electrode 30.

After a preset period of time set in the gun controller has elapsed and the melted area between the flat weld region 60 and the metal sheet 20 has grown sufficiently, the gun controller increases the pressing force applied to the stacked assembly 16b by the first welding tip 10 and the second welding tip 12 from F1 to F2. The applied electric current then flows preferentially as the electric current i shown in FIG. 4 along a direction from the first welding tip 10 to the second welding tip 12.

According to the second embodiment, therefore, a sufficiently large nugget can be formed in the vicinity of the contacting surfaces of the metal sheet 20 as the high-resistance workpiece and the flat weld region 60 as the low-resistance workpiece, and a sufficiently large nugget can also be formed in the vicinity of the contacting surfaces of the metal sheets 18, 20 as the high-resistance workpieces. As with the first embodiment, sputtering is prevented from occurring between the metal sheets 18, 20 and also between the metal sheet 20 and the flat weld region 60.

For spot-welding the stacked assembly 16b successively at a plurality of locations, the first welding tip 10 and the second welding tip 12 are displaced from a welded location to another location where the stacked assembly 16b is pressed under the control of the gun controller in the manner described above. In FIG. 6, the stacked assembly 16b is illustrated as being spot-welded at a plurality of such locations 62a through 62c.

In the first embodiment and the second embodiment, each of the stacked assemblies 16a, 16b comprises three stacked workpieces. However, the number of the stacked workpieces is not limited particularly, and the present invention is also applicable to a spot welding method and a spot welding apparatus for spot-welding any number of workpieces, e.g., four or more workpieces.

The stacked assembly to be spot-welded according to the present invention is not limited to a combination of the metal sheets 18, 20 made of high tensile strength steel and the metal sheet 22 (or the flat weld region 60) made of mild steel.

The electric current applied in the spot-welding method does not need to be of a constant value from the start to end of the spot-welding process. Instead, an electric current applied while the stacked assembly is pressed under the first pressing force F1 and an electric current applied while the stacked assembly is pressed under the second pressing force F2 may be different from each other.

Although certain preferred embodiments of the present invention have been shown and described in detail, it should be understood that various changes and modifications may be made therein without departing from the scope of the appended claims.

What is claimed is:

1. A spot welding method for spot-welding a stacked assembly constructed such that plurality of high-resistance workpieces are stacked with a low-resistance workpiece, wherein all of the workpieces include metal sheets and the low-resistance workpiece is the thinnest among all the workpieces in the stacked assembly, the method comprising the steps of:
    holding a first welding tip in abutment against the low-resistance workpiece which is disposed on one side of the stacked assembly;
    holding a second welding tip in abutment against one of the high-resistance workpieces which is disposed on another side of the stacked assembly;
    engaging a branch current electrode to an inner workpiece that is another of the high-resistance workpieces and positioned adjacent to the low-resistance workpiece to establish electrical communication between the inner workpiece and the branch current electrode, the branch current electrode being either a ground electrode or an electrode which has a same polarity as the second welding tip;
    directing a larger amount of electric current from the first welding tip through the inner workpiece toward the branch current electrode than toward the second welding tip by pressing the stacked assembly with a first pressing force, wherein the first pressing force is commensurate with intensity for contacting the low-resistance workpiece with the inner workpiece and for contacting the high-resistance workpieces to each other at positions aligned with the first welding tip and the second welding tip; and
    directing a larger amount of electric current toward the second welding tip than toward the branch current electrode by pressing the stacked assembly with a second pressing force which is larger than the first pressing force.

2. The spot welding method according to claim 1, wherein the branch current electrode is electrically connected to the second welding tip thereby to make the electrode have the same polarity as the second welding tip.

3. The spot welding method according to claim 1, wherein a cut-off portion is formed on the high-resistance workpiece on the one side of the stacked assembly to expose part of the inner workpiece, and the inner workpiece and the branch current electrode are engaged together via the cut-off portion.

4. The spot welding method according to claim 1, further comprising the step of additionally gripping the stacked assembly with a clamping mechanism, the clamping mechanism includes the ground electrode which is engaged to the inner workpiece.

* * * * *